United States Patent
Zeng et al.

(10) Patent No.: US 11,328,418 B2
(45) Date of Patent: May 10, 2022

(54) METHOD FOR VEIN RECOGNITION, AND APPARATUS, DEVICE AND STORAGE MEDIUM THEREOF

(71) Applicant: Wuyi University, Jiangmen (CN)

(72) Inventors: Junying Zeng, Jiangmen (CN); Fan Wang, Jiangmen (CN); Chuanbo Qin, Jiangmen (CN); Boyuan Zhu, Jiangmen (CN); Jingming Zhu, Jiangmen (CN); Yikui Zhai, Jiangmen (CN); Junying Gan, Jiangmen (CN)

(73) Assignee: Wuyi University, Jiangmen (CN)

( * ) Notice: Subject to any disclaimer, the term of this patent is extended or adjusted under 35 U.S.C. 154(b) by 29 days.

(21) Appl. No.: 16/831,239

(22) Filed: Mar. 26, 2020

(65) Prior Publication Data
US 2021/0097681 A1    Apr. 1, 2021

(30) Foreign Application Priority Data
Sep. 26, 2019    (CN) .......................... 2019109184624

(51) Int. Cl.
*G06T 7/00*        (2017.01)
*G06N 3/08*        (2006.01)
(Continued)

(52) U.S. Cl.
CPC ............ *G06T 7/0012* (2013.01); *G06N 3/04* (2013.01); *G06N 3/082* (2013.01); *G06T 5/50* (2013.01);
(Continued)

(58) Field of Classification Search
CPC .................... G06T 7/0012; G06T 5/50; G06T 2207/20081; G06T 2207/20084;
(Continued)

(56) References Cited

U.S. PATENT DOCUMENTS
2020/0097802 A1* 3/2020 Gudovskiy .............. G06N 3/04

FOREIGN PATENT DOCUMENTS
CN         109409226 A  *  3/2019

OTHER PUBLICATIONS

English Translation of CN109409226A (Year: 2019).*
(Continued)

*Primary Examiner* — Jon Chang
(74) *Attorney, Agent, or Firm* — Vivacqua Crane PLLC

(57) ABSTRACT

Disclosed is a method for vein recognition, the method includes: performing a difference operation and a channel connection on two to-be-verified target vein images respectively to obtain a difference image and a two-channel image of the two target vein images; performing the channel connection on the obtained difference image and two-channel image to obtain a three-channel image, so as to use the three-channel image as an input of a CNN network; fine-tuning a pre-trained model SqueezeNet that completes training on an ImageNet; integrating the difference image and the three-channel image through a cascade optimization framework to obtain a recognition result; regarding a pair of to-be-verified images as a sample, transforming the sample, taking the transformed sample as the input of the CNN network, obtaining a recognition result by supervised training on the network.

6 Claims, 9 Drawing Sheets

(51) Int. Cl.
 *G06T 5/50* (2006.01)
 *G06V 40/14* (2022.01)
 *G06V 10/82* (2022.01)
 *G06V 40/10* (2022.01)
 *G06N 3/04* (2006.01)

(52) U.S. Cl.
 CPC .............. *G06V 10/82* (2022.01); *G06V 40/10* (2022.01); *G06V 40/14* (2022.01); *G06N 3/08* (2013.01); *G06T 2207/20081* (2013.01); *G06T 2207/20084* (2013.01); *G06T 2207/20224* (2013.01); *G06T 2207/30101* (2013.01)

(58) Field of Classification Search
 CPC ........... G06T 2207/20224; G06T 2207/30101; G06N 3/04; G06N 3/082; G06N 3/0454; G06N 3/08; G06K 9/6271; G06K 2009/00932; G06K 9/00885; G06K 9/6268; G06V 40/14; G06V 10/82; G06V 40/10
 See application file for complete search history.

(56) References Cited

OTHER PUBLICATIONS

Song et al. "Finger-Vein Recognition Based on Deep DenseNet Using Composite Image." IEEE Access, vol. 7, May 23, 2019, pp. 66845-66863 (Year: 2019).*
Wan et al. "Dorsal Hand Vein Recognition Based on Convolutional Neural Networks." IEEE International Conference on Bioinformatics and Biomedicine, Nov. 13, 2017, pp. 1215-1221 (Year: 2017).*

* cited by examiner

| Layer number | Layer type | Operation size/step size/number | Output size |
|---|---|---|---|
| 0 | Input layer | — | 227x227x3 |
| 1 | Conv | 3x3/2/64 | 113x113x64 |
| — | Max pooling | 3x3/2/— | 56x56x64 |
| 2-3 | Fire module | $\begin{bmatrix} 1x1 & 1 & 16 \\ 1x1 & 1 & 64 \\ 3x3 & 1 & 64 \end{bmatrix}$ | 56x56x128 |
| — | Max pooling | 3x3/2/— | 27x27x128 |
| 4-5 | Fire module | $\begin{bmatrix} 1x1 & 1 & 32 \\ 1x1 & 1 & 128 \\ 3x3 & 1 & 128 \end{bmatrix}$ | 27x27x256 |
| — | Max pooling | 3x3/2 | 13x13x256 |
| 6-7 | Fire module | $\begin{bmatrix} 1x1 & 1 & 48 \\ 1x1 & 1 & 192 \\ 3x3 & 1 & 192 \end{bmatrix}$ | 13x13x384 |
| 8-9 | Fire module | $\begin{bmatrix} 1x1 & 1 & 64 \\ 1x1 & 1 & 256 \\ 3x3 & 1 & 256 \end{bmatrix}$ | 13x13x512 |
| — | Dropout | — | 13x13x512 |
| 10 | Conv | 1x1/1/2 | 13x13x2 |
| — | Global avgpool | — | 2 |
| — | softmax | — | 2 |

Fig.6

METHOD FOR VEIN RECOGNITION, AND APPARATUS, DEVICE AND STORAGE MEDIUM THEREOF

CROSS-REFERENCE TO RELATED APPLICATIONS

This application is based on and claims the benefit of priority from Chinese Patent Application No. 2019109184624, filed on 26 Sep. 2019, the entirety of which is incorporated by reference herein.

TECHNICAL FIELD

The present disclosure relates to the field of neural network algorithms, and in particular, to a method for vein recognition, and apparatus, device and a storage medium thereof.

BACKGROUND

Currently, the vein recognition technology, as a second-generation biometric authentication technology with high anti-counterfeiting, has attracted much attention. Compared with traditional biometric features such as fingerprints, human faces and iris, vein recognition has two significant advantages: internal features and in vivo detection. Specifically, veins are hidden inside the human body, which are less vulnerable to theft and influences on recognition from wear and tear on the skin than external features such as fingerprints. Vein imaging relies on the absorption of near-infrared light by hemoglobin, which can be done only by living blood, so the vein imaging is difficult to fake. At present, vein recognition mainly includes hand dorsal vein recognition, palm vein recognition and finger vein recognition. Compared with the other two, the finger vein recognition has its unique advantages: it requires a small collection device and has a wider application prospect; and recognition performance can be further improved by using vein information of multiple fingers. The finger vein recognition has been applied to ATM machines, access control systems, vending machines and various log-in products in some countries or regions. However, at the same time, in the process of finger vein image collection, it is difficult to capture high-quality finger vein images, so the subsequent recognition process is still very challenging. Because of its unique advantages, broad application scenarios and challenges, increasingly more researchers have paid attention to the finger vein recognition.

A traditional finger vein recognition system mostly adopts the features of manual design, which are usually sensitive to imaging quality of images and finger posture changes, and the preprocessing process in the early stage is too complicated and the final performance of the system is still limited. To address the shortcomings of such methods, a few researchers have proposed a Convolutional Neural Networks (CNN)-based finger method for vein recognition. In recent years, the CNN has been widely used in image and other fields. Its powerful feature expression capability is acquired through gradual learning, so it has better expressiveness and robustness.

The CNN-based finger method for vein recognition can directly learn from original Region Of Interest (ROI) images automatically and extract features with stronger distinguishing capability, without the need for preprocessing, enhancement and other processes, which greatly simplifies the image preprocessing process. However, most of the existing CNN-based finger method for vein recognitions adopt complicated network structures (such as VGGNet-16) or stepwise processing (such as CNN+SVM), which cannot be applied to hardware platforms with limited computing power and small memory and meet end-to-end requirements. In addition, compared with human face databases, existing finger vein databases are fewer and their data volume is smaller. The existing CNN-based finger method for vein recognition often needs data augmentation before network training.

SUMMARY

To address the shortcomings of the prior arts, the present disclosure aims at providing a method for vein recognition, and apparatus, device and a storage medium thereof, which can not only solve the problem of less training data but also improve the accuracy of recognition with a small network storage capacity.

The technical schemes adopted by the present disclosure to solve its problems are as follows:

In a first aspect, the present disclosure provides a method for vein recognition, the method includes:

performing a difference operation and a channel connection on two to-be-verified target vein images respectively to obtain a difference image and a two-channel image of the two target vein images;

performing the channel connection on the obtained difference image and two-channel image to obtain a three-channel image, so as to use the three-channel image as an input of a CNN network;

fine-tuning a pre-trained model SqueezeNet that completes training on an ImageNet; and integrating the difference image and the three-channel image through a cascade optimization framework to obtain a recognition result.

Further, performing a difference operation and a channel connection on two to-be-verified target vein images respectively comprises: taking a pair of to-be-verified homologous or heterologous images as a sample, adding or subtracting the sample by arithmetic operation or directly superimposing the sample on the channel, and taking the processed sample as the input of the CNN network for supervised training on the network.

Further, the integrating the difference image and the three-channel image through a cascade optimization framework to obtain a recognition result comprises: fine-tuning a pre-trained SqueezeNet model for the first time with the difference image to obtain an optimization model, and fine-tuning the optimization model for the second time with the three-channel image to obtain a final optimization model.

Further, the SqueezeNet in the fine-tuning a pre-trained model SqueezeNet that completes training on an ImageNet comprises a Fire module.

Further, the Fire module comprises a squeeze layer and an expand layer, wherein the squeeze layer is a convolutional layer composed of a 1*1 convolutional kernel, and the expand layer is a convolutional layer composed of 1*1 and 3*3 convolutional kernels connected.

Further, the two to-be-verified target vein images are homologous or heterologous images.

In a second aspect, the present disclosure provides an apparatus for vein recognition, the apparatus includes:

an arithmetic unit for performing a difference operation and a channel connection on two to-be-verified target vein images respectively to obtain a difference image and a two-channel image of the two target vein images;

a generation unit for performing the channel connection on the obtained difference image and two-channel image to obtain a three-channel image, so as to use the three-channel image as an input of a CNN network;

a training unit for fine-tuning a pre-trained model SqueezeNet that completes training on an ImageNet; and a recognition unit for integrating the difference image and the three-channel image through a cascade optimization framework to obtain a recognition result.

In a third aspect, the present disclosure provides a vein recognition device, comprising at least one control processor and a memory communicatively connected with the at least one control processor, wherein the memory stores instructions executable by the at least one control processor, and the instructions are executed by the at least one control processor to enable the at least one control processor to perform the method for vein recognition described above.

In a fourth aspect, the present disclosure provides a non-transitory computer readable storage medium storing instructions that, when executed by a computer, cause the computer to perform the method for vein recognition as described above.

In a fifth aspect, the present disclosure provides a computer program product, wherein the computer program product comprises a computer program stored on a computer readable storage medium, the program product comprises program instructions that, when executed by a computer, cause the computer to perform the method for vein recognition as described above.

The one or more technical schemes provided in the embodiments of the present disclosure have at least the following beneficial effects:

a pair of to-be-verified images is regarded as a sample which is subjected to transformation, the transformed sample is taken as the input of the CNN network, and a recognition result is obtained by supervised training on the network, which can not only solve the problem of less training data but also improve the accuracy of recognition with a small network storage capacity.

BRIEF DESCRIPTION OF THE DRAWINGS

The present disclosure is further described below with reference to the accompanying drawings and examples.

FIG. 6 is a network structure parameter diagram of a method of Embodiment 3 of the present disclosure;

DETAILED DESCRIPTION

To make the objectives, technical schemes and advantages of the present disclosure more comprehensible, the present disclosure is described below in further detail with reference to the accompanying drawings and embodiments. It should be appreciated that the specific embodiments described here are only used to explain the present disclosure and are not intended to limit the present disclosure.

In the description of the present disclosure, "several" means one or more, and "multiple" means more than two, "greater than, less than, more than, etc.," are understood as not including the number itself, while "above, below, within, etc.," are understood as including the number itself. It should be noted that the terms first and second are only used to distinguish technical features, and cannot be understood as indicating or implying relative importance or implicitly indicating the number of technical features indicated or implicitly indicating the precedence of the technical features indicated.

It should be noted that if there is no conflict, the features in the embodiments of the present disclosure may be combined with each other and are within the protection scope of the present disclosure. Besides, although functional modules are divided in the apparatus diagram and the logical sequence is shown in the flowchart, in some cases, the steps shown or described may be performed in an order different from that of the module division in the apparatus or in the flowchart.

Figure 1:
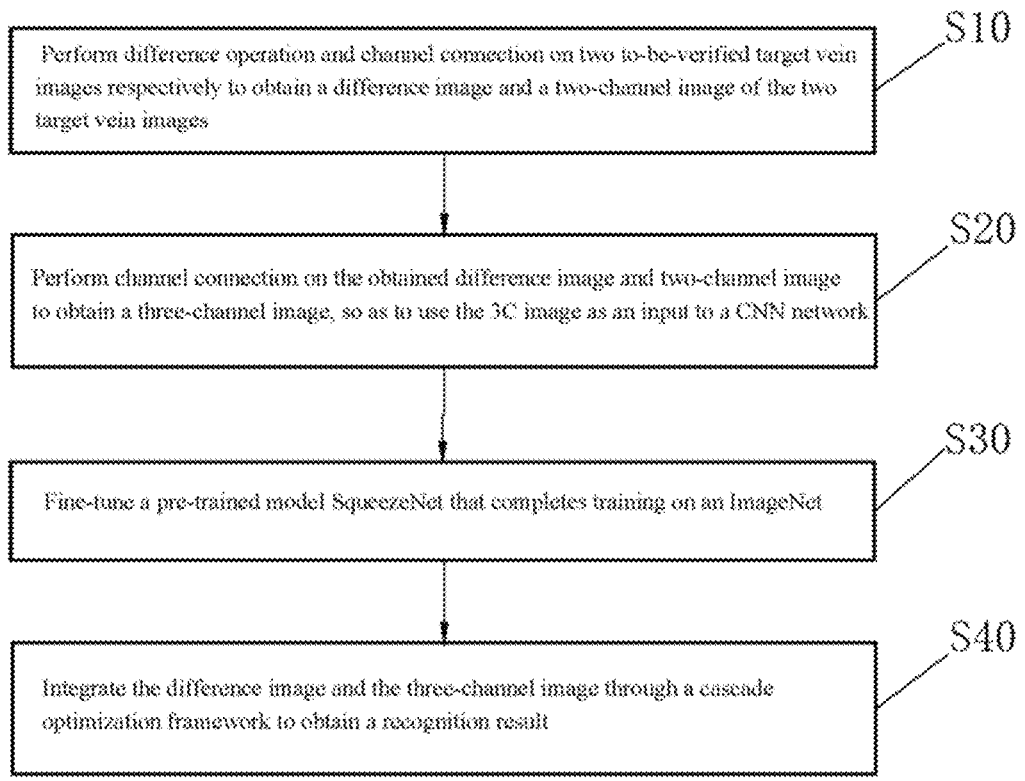
FIG. 1 is a flowchart of a method of Embodiment 1 of the present disclosure.

Referring to FIG. 1, a method for vein recognition according to an embodiment of the present disclosure includes:

performing a difference operation and a channel connection on two to-be-verified target vein images respectively to obtain a difference image and a two-channel image of the two target vein images;

performing the channel connection on the obtained difference image and two-channel image to obtain a three-channel image, so as to use the three-channel image as an input of a CNN network;

fine-tuning a pre-trained model SqueezeNet that completes training on an ImageNet; and integrating the difference image and the three-channel image through a cascade optimization framework to obtain a recognition result.

In the method for vein recognition according to the embodiment of the present disclosure, performing a difference operation and a channel connection on two to-be-verified target vein images respectively includes: taking a pair of to-be-verified homologous or heterologous images as a sample, adding or subtracting the sample by arithmetic operation or directly superimposing the sample on the channel, and taking the processed sample as the input of the CNN network for supervised training on the network.

In the method for vein recognition according to the embodiment of the present disclosure, the integrating the difference image and the three-channel image through a cascade optimization framework to obtain a recognition result includes: fine-tuning a pre-trained SqueezeNet model for the first time with the difference image to obtain an optimization model, and fine-tuning the optimization model for the second time with the three-channel image to obtain a final optimization model.

The above method for vein recognition is further compared with the traditional recognition method and described in detail, which is specifically as follows.

The existing CNN-based finger method for vein recognition does not comprehensively consider recognition accuracy, a network model size, or end-to-end recognition, but usually only considers one or two of them. In the case of limited finger vein image data, if it is necessary to train an end-to-end finger vein recognition with high accuracy and a small network storage capacity, the existing model cannot achieve that. Therefore, the present disclosure proposes a finger method for vein recognition for cascade optimization based on a difference image and a three-channel image.

Figure 2:
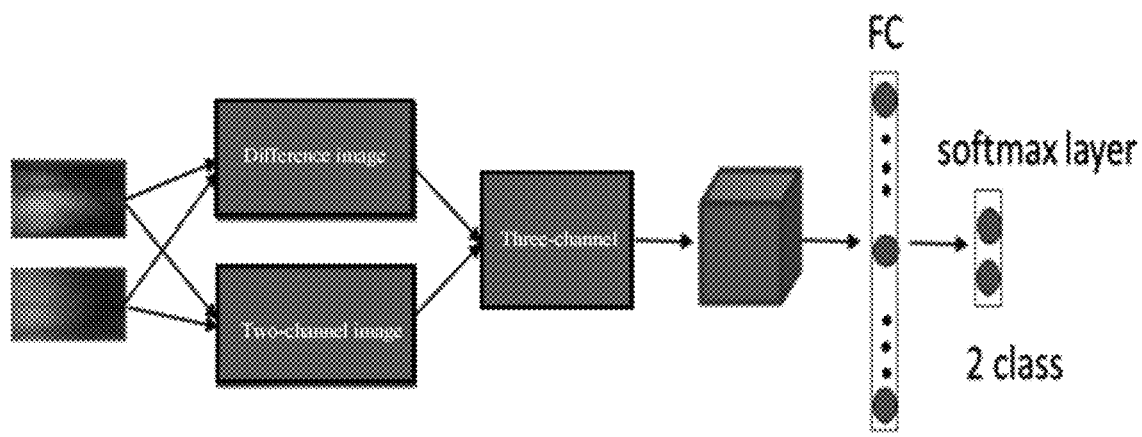
FIG. 2 is a schematic architectural diagram of a CNN of a difference image and a three-channel image obtained in a method of Embodiment 1 of the present disclosure.

FIG. 2 is the architecture of a CNN of a difference image and a three-channel image obtained according to the method of the present disclosure. A pair of to-be-verified images is regarded as a sample which is subjected to transformation, the transformed sample is used as an input of the CNN, and a recognition result is output by supervised training on the network.

It should be noted that the sample image may be a homologous or heterologous image.

It should be noted that the transformation may be operations of addition and subtraction, and direct superposition on the channel may be regarded as the various processing on this sample.

For a customized network, the difference image is directly used as an input of the network for training. When a pre-trained model trained on an ImageNet is fine-tuned with the difference image, channel replication has to be performed on the difference image first, so that the image can be input to the pre-trained model only when the channel number of the image is 3. For example, the channel number of a two-channel image is 2, and the two-channel image cannot fine-tune the pre-trained model trained on the ImageNet, and can only customize a network for retraining. The channel replication on the difference image is only a simple repetition of input data and does not make full use of limited data. In order to avoid channel replication of the difference image and to achieve fine-tune of the pre-trained model, channel connection is performed between the difference image and the two-channel image to obtain a three-channel image, and the three-channel image is taken as an input of the network.

Figure 3:
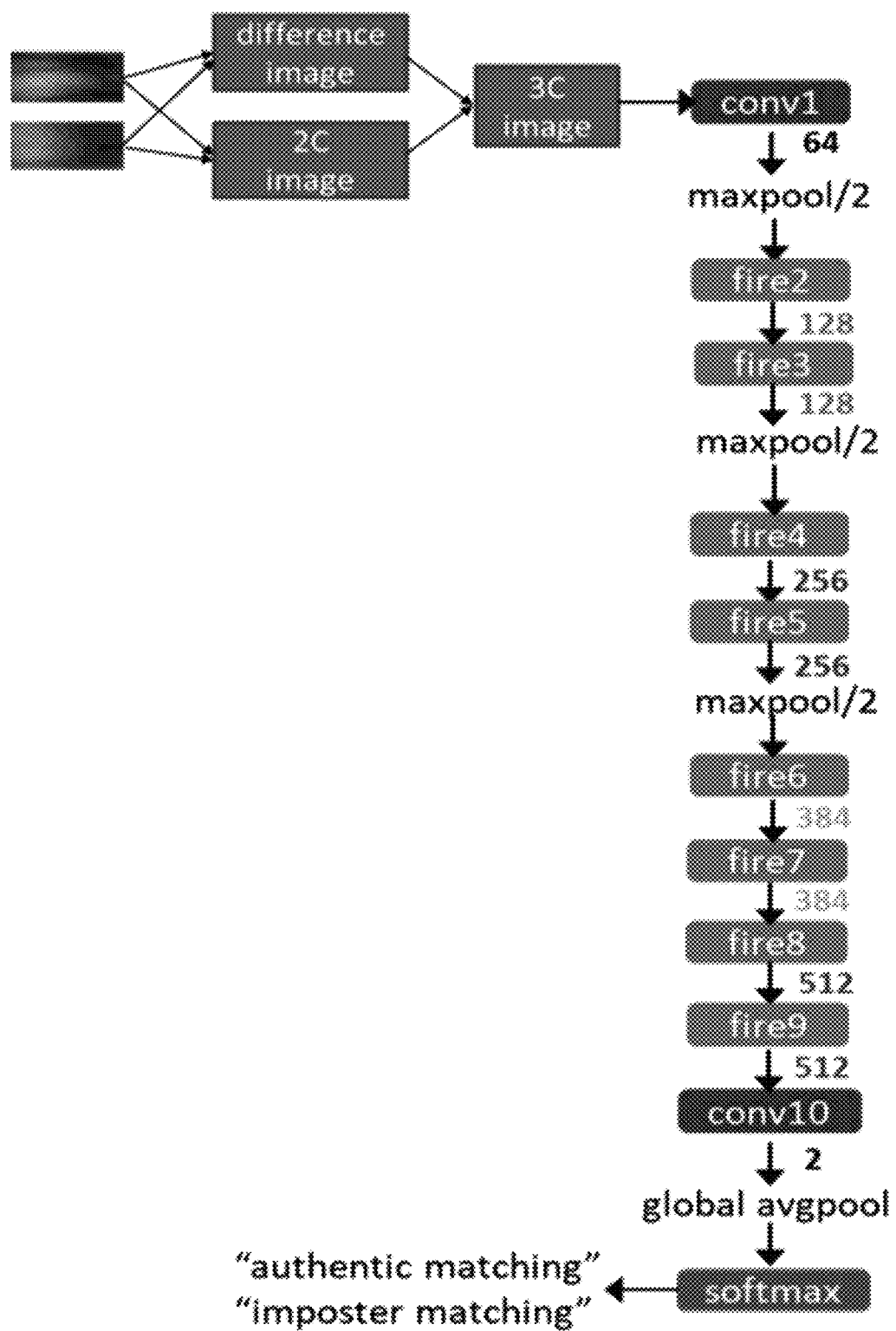
FIG. 3 is a schematic diagram of a SqueezeNet-based finger vein recognition network in a method of Embodiment 2 of the present disclosure.

FIG. 3 is a SqueezeNet-based finger vein recognition network. SqueezeNet is designed based on three strategies: (1) replace 3*3 convolution with 1*1 convolution: reduce the parameter to ⅑ of the original; (2) reduce the number of input channels: this part is implemented by using a squeeze layer; and (3) the delay of an under-sampling operation may provide a larger activation map for the convolutional layer: the larger activation map retains more information and can provide higher classification accuracy.

The input of the network is the above three-channel image, that is, a result image obtained by channel connection between the difference image and the two-channel image of the image pair. The number of output categories of the network is 2, that is, homologous or heterologous. The SqueezeNet adopted by the network part is started with a convolutional layer (conv1), followed by eight Fire modules (fire2-fire9), and ended with a convolutional layer (conv10). The number of filters in each fire module increases gradually, and max-pooling with a step size of 2 is used after the conv1, fire3 and fire5 layers. In addition, a relu activation function is used after each cony layer; dropout is used after fire9 to prevent overfitting. Global average pooling is used after conv10, and a softmax activation function is used for a global average pooling layer, which is an output of the whole network after activation.

It should be noted that the whole network does not use a full connection layer. The number of convolutional kernels used by conv10 is N (N is the number of classification categories) and the size is 1*1, followed by the global average pooling, which can play the same role as the full connection layer, but the weight parameters are much fewer than those of the full connection layer. Specific network structure parameters are as shown in FIG. 6.

Figure 4:
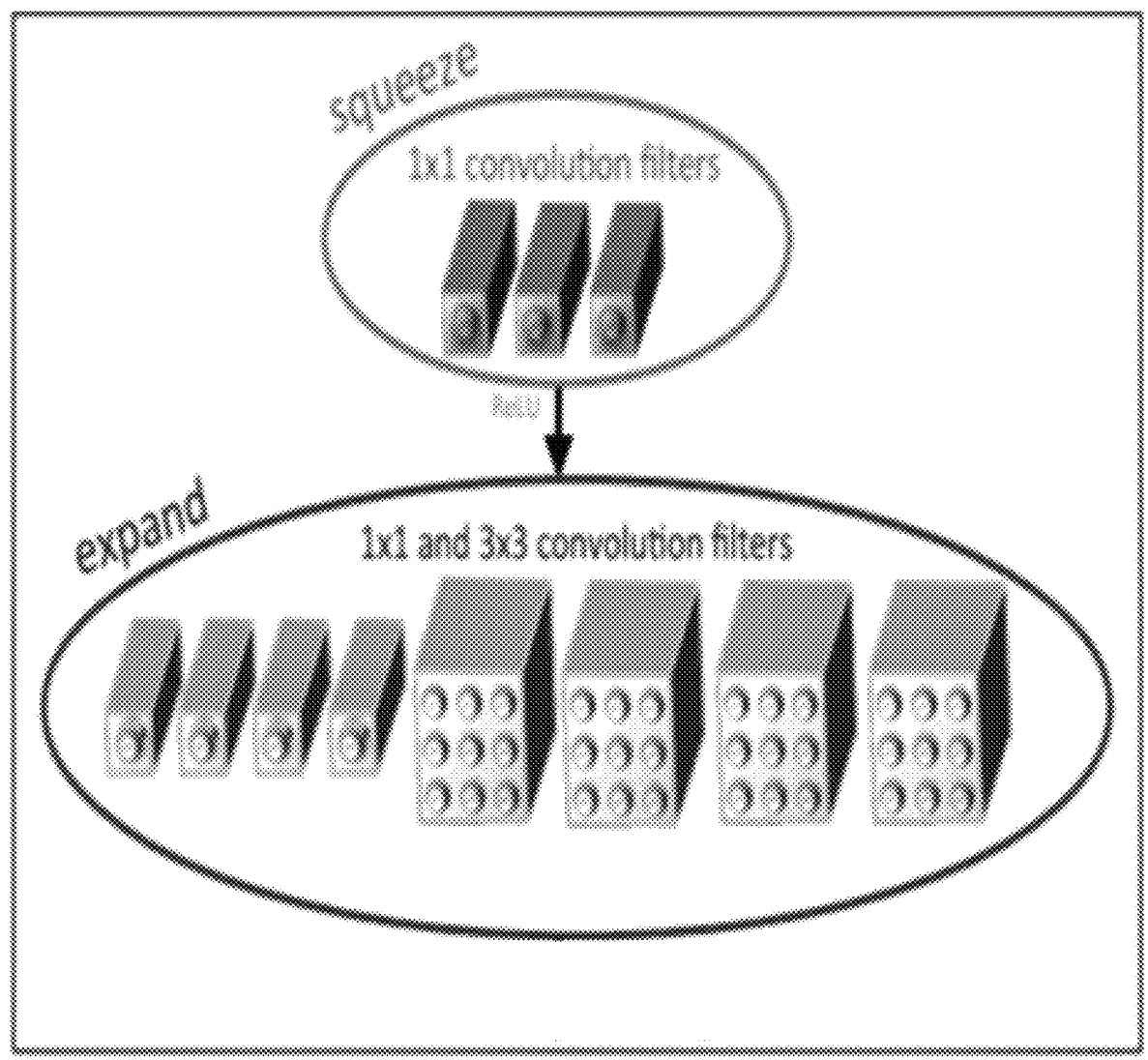
FIG. 4 is a schematic diagram of a Fire module in a method of Embodiment 2 of the present disclosure.
Figure 5:
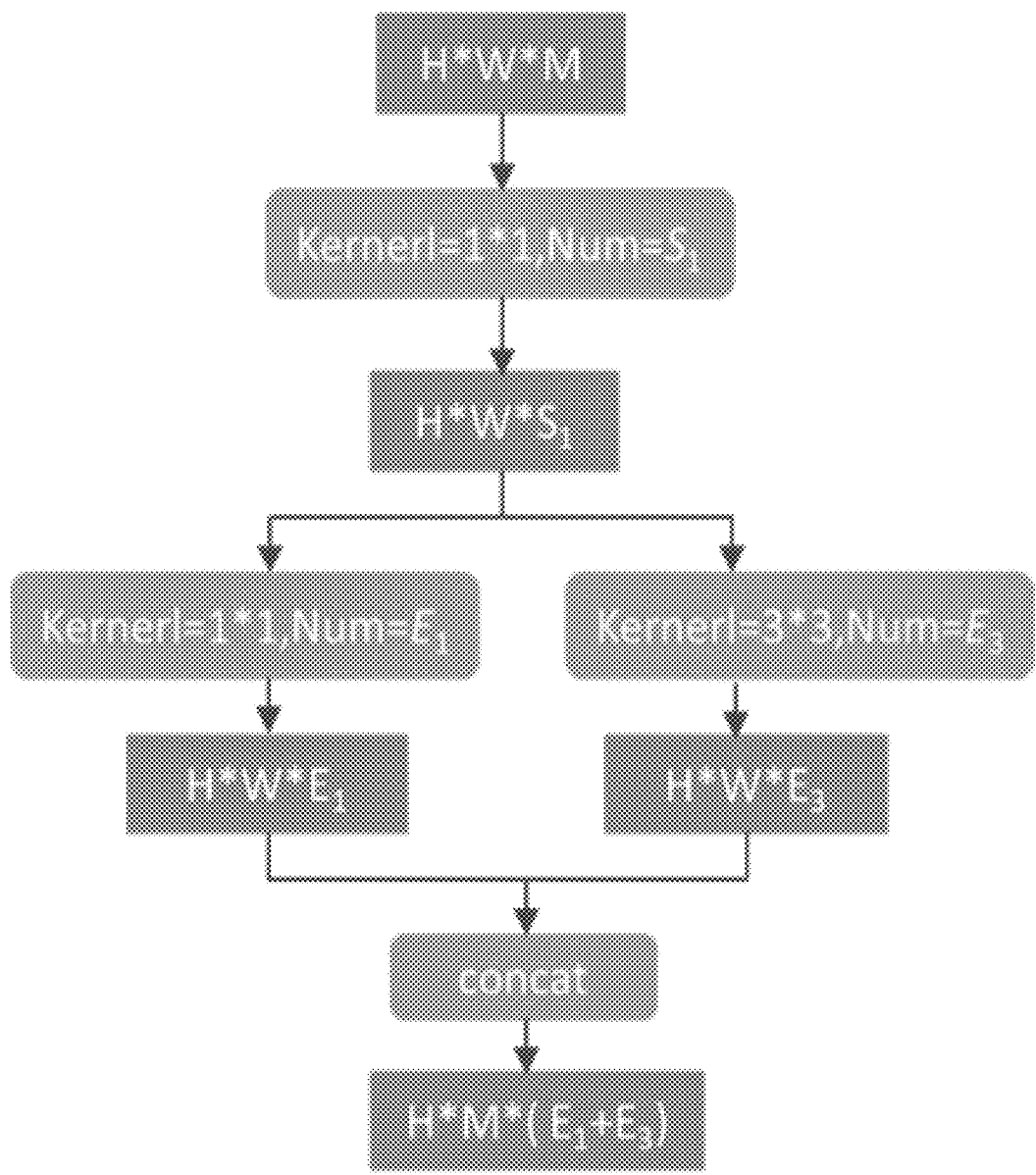
FIG. 5 is a schematic diagram of operations of a Fire module in a method of Embodiment 3 of the present disclosure.

FIG. 4 is a Fire module used in the SqueezeNet, which is a core part of the SqueezeNet. Its structure is as shown in FIG. 5. The Fire module consists of two layers: a squeeze layer and an expand layer. The squeeze layer is a convolutional layer composed of a 1*1 convolutional kernel, and the expand layer is a convolutional layer composed of 1*1 and 3*3 convolutional kernels connected. The Fire module has three adjustable parameters: S1, E1 and E3. S1 represents the number of the convolutional kernel in the squeeze layer, E1 represents the number of the 1*1 convolutional kernel in the expand layer, and E3 represents the number of the 3*3 convolutional kernel in the expand layer. Specific operations are as shown in FIG. 5. Firstly, a featuremap of H*W*M passes through the squeeze layer to obtain S1 featuremaps, where S1 is less than M to achieve the purpose of "compression." Secondly, the featuremap of H*W*S1 is input to the expand layer, which is convoluted through the 1*1 convolutional layer and the 3*3 convolutional layer, respectively. Then concat (that is, channel connection) is applied to the result, and the output of the Fire module is a featuremap of H*W*(E1+E3). When a featuremap input by the Fire module is H*W*M, an output featuremap is H*W*(E1+E3), that is, the resolution of the featuremap is unchanged, and only the channel number changes.

Figure 7:
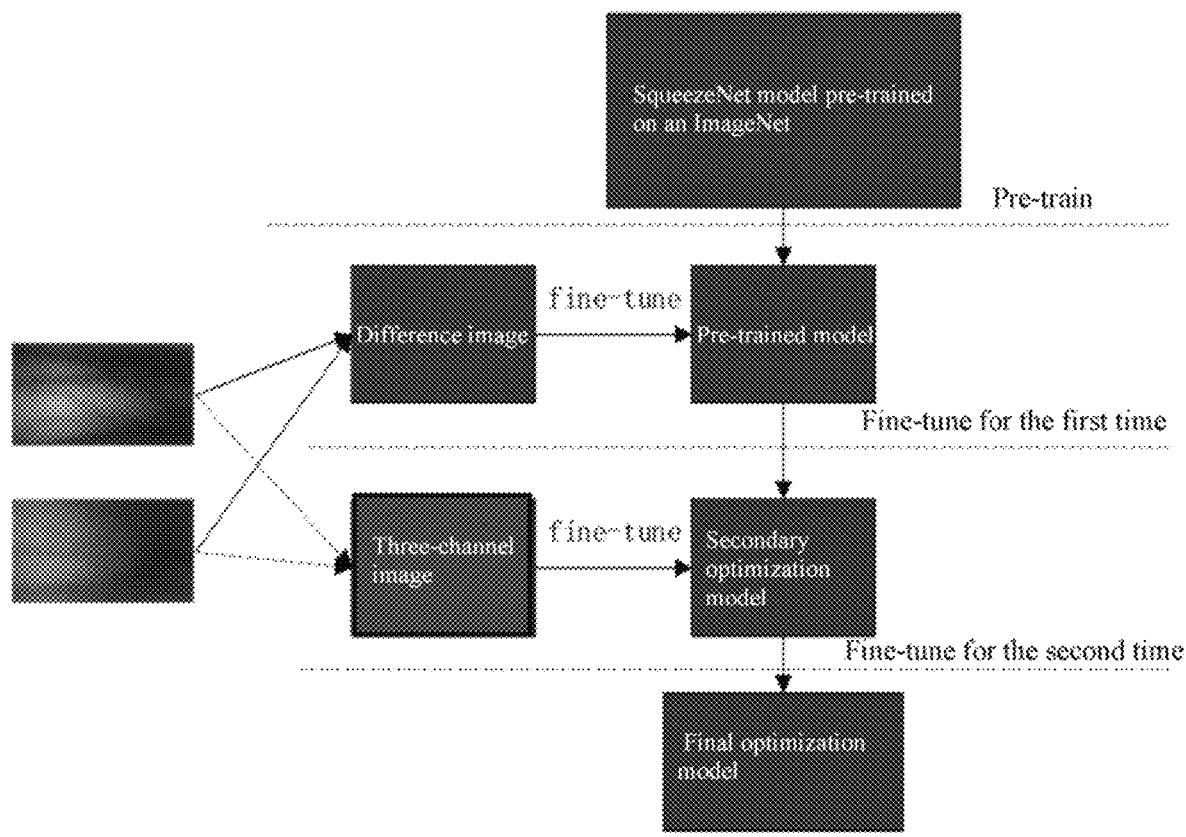
FIG. 7 is a schematic diagram of a cascade optimization network framework based on a difference image and a three-channel image in a method of Embodiment 3 of the present disclosure.

FIG. 7 is a cascade optimization network framework based on a difference image and a three-channel image. The difference image is transformed into a three-channel image by channel replication, and then fine-tunes a model pre-trained on the ImageNet, while the three-channel image proposed in the present disclosure can directly fine-tune the pre-trained model. A pair of to-be-recognized images is regarded as a sample, and the difference image and the three-channel image are regarded as different representations of the sample. The difference image focuses on describing the difference between the pair of images corresponding to the sample, while the three-channel image not only retains information of the pair of images corresponding to the sample, but also simply describes the difference of the two images. In order to take full advantage of the difference and information of the pair of to-be-recognized images and to be able to fine-tune the pre-trained SqueezeNet on the ImageNet, the present disclosure provides a cascade optimization network framework based on a difference image and a three-channel image.

In the field of image classification and recognition, a method of sending different features, attributes or regions of an original image into a deep neural network for learning and fusion can achieve good effects. In the cascade optimization network framework used in the present disclosure, during implementation, a pre-trained SqueezeNet model is fine-tuned for the first time with the difference image to obtain an secondary optimization model, and then the secondary optimization model is fine-tuned for the second time with the three-channel image to obtain a final optimization model through which a high-accuracy recognition result is obtained. The above method for vein recognition can not only solve the problem of less training data but also improve the accuracy of recognition with a small network storage capacity.

Figure 8:
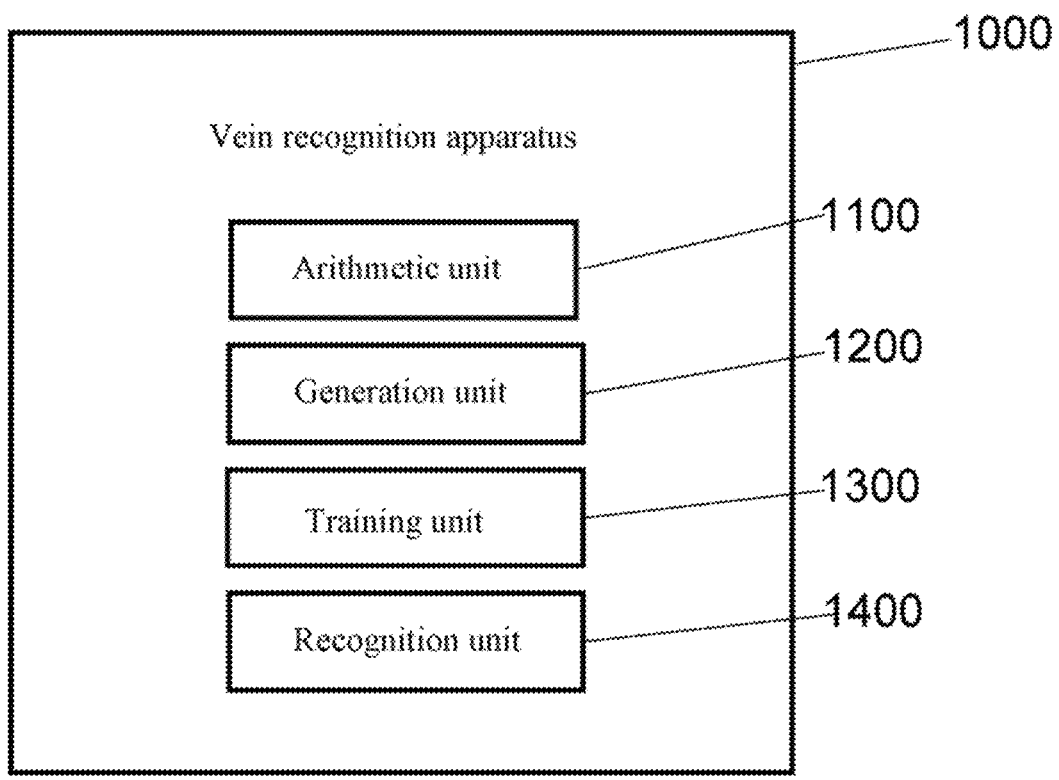
FIG. 8 is a schematic apparatus diagram of a method of Embodiment 3 of the present disclosure.

Referring to FIG. 8, an embodiment of the present disclosure further provides an apparatus for vein recognition, including:

an arithmetic unit 1100 for performing a difference operation and a channel connection on two to-be-verified target vein images respectively to obtain a difference image and a two-channel image of the two target vein images;

a generation unit 1200 for performing the channel connection on the obtained difference image and two-channel image to obtain a three-channel image, so as to use the three-channel image as an input to a CNN network;

a training unit 1300 for fine-tuning a pre-trained model SqueezeNet that completes training on an ImageNet; and a recognition unit 1400 for integrating the difference image and the three-channel image through a cascade optimization framework to obtain a recognition result.

It should be noted that since the apparatus for vein recognition in this embodiment and the above method for vein recognition are based on the same inventive concept, the corresponding contents in the method embodiment are also applicable to the apparatus embodiment, and will not be described in detail here.

Figure 9:
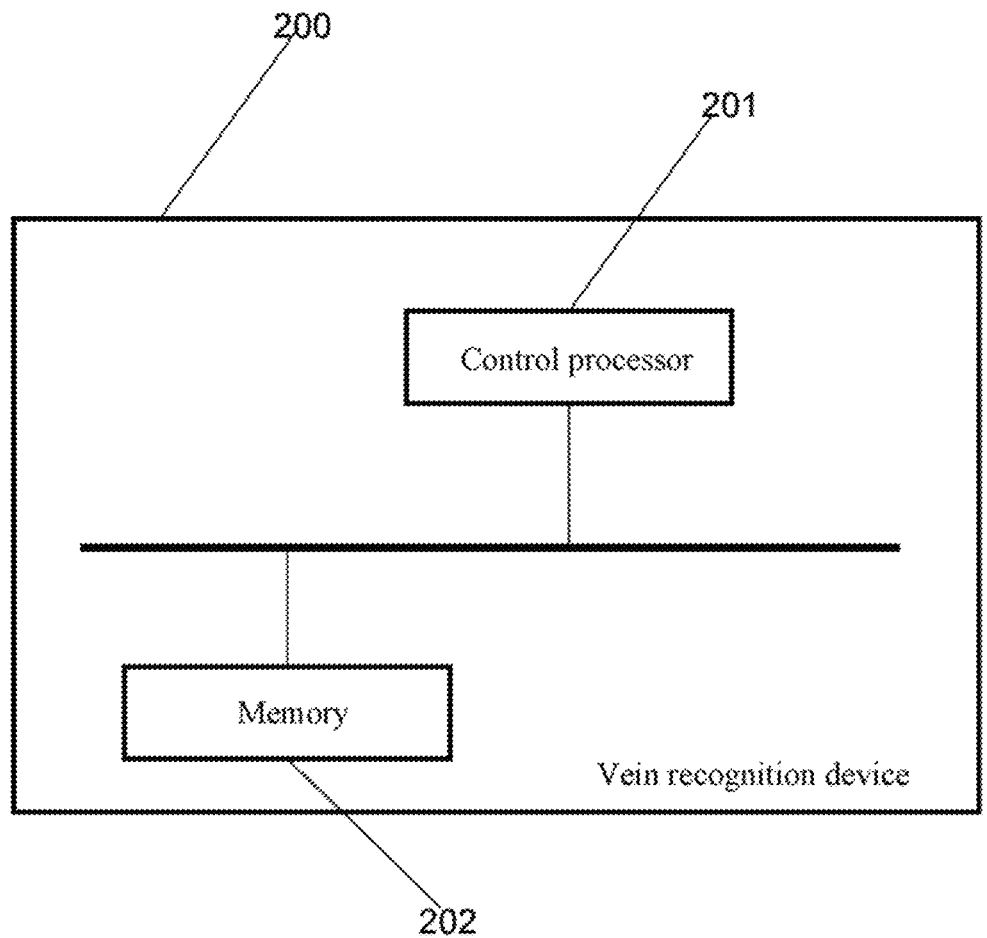
FIG. 9 is a schematic device structure diagram of a method of Embodiment 3 of the present disclosure.

Referring to FIG. 9, an embodiment of the present disclosure further provides a vein recognition device. The vein recognition device 200 may be any type of smart terminals, such as a mobile phone, a tablet computer, a personal computer, etc.

Specifically, the vein recognition device 200 includes: one or more control processors 201 and a memory 202. FIG. 9 shows an example of one control processor 201.

The control processor 201 and the memory 202 may be connected via a bus or in other manners. FIG. 9 shows an example of their connection via a bus.

The memory 202, as a nonvolatile computer readable storage medium, can be used for storing software programs, computer executable programs and modules, for example, program instructions/modules corresponding to the method for vein recognition in the embodiment of the present disclosure, such as the arithmetic unit 1100, the generation unit 1200, the training unit 1300, and the recognition unit 1400 shown in FIG. 8. The control processor 201 runs the software programs, instructions and modules stored in the memory 202 to execute various functional applications and data processing of the apparatus for vein recognition 1000, that is, the method for vein recognition in the above method embodiment is implemented.

The memory 202 may include a program storage area and a data storage area. The program storage area may store an operating system and an application required by at least one function. The data storage area may store data created according to use of the apparatus for vein recognition 1000. In addition, the memory 202 may include a high-speed random access memory, and may further include a nonvolatile memory, for example, at least one disk storage device, a flash memory device, or other volatile solid-state storage devices. In some implementations, the memory 202 optionally includes memories remotely disposed relative to the control processor 201. The remote memories can be connected to the vein recognition device 200 via a network. Examples of the networks include, but are not limited to, the Internet, an Intranet, a LAN, a mobile communication network and their combinations.

The one or more modules are stored in the memory 202, and when they are executed by the one or more control processors 201, the method for vein recognition in the above method embodiment is performed, for example, the steps S10 to S50 in the method of FIG. 1 described above are performed to implement the functions of the units 1100-1400 in FIG. 8.

An embodiment of the present disclosure further provides a computer readable storage medium. The computer readable storage medium stores computer executable instructions. When the computer executable instructions are executed by the one or more control processors 201, for example, executed by one control processor 201 in FIG. 9, the one or more control processors 201 can be caused to perform the method for vein recognition in the above method embodiment, for example, the steps S10 to S50 in the method of FIG. 1 described above are performed to implement the functions of the units 1100-1400 in FIG. 8.

The apparatus embodiment described above is merely exemplary. The units described as separate parts may or may not be physically separate, that is, they may be located in one position, or may be distributed on multiple network units. Some or all of the modules may be selected according to actual needs to achieve the objective of the scheme of this embodiment.

Through the above description of the implementations, it is apparent to a person skilled in the art that the implementations may be accomplished by software plus a universal hardware platform. A person of ordinary skill in the art should understand that all or a part of the process of the method in the above embodiment may be implemented by a computer program instructing relevant hardware. The program may be stored in a computer readable storage medium. When the program is run, the process in the above method embodiment may be included. The storage medium may be a magnetic disk, an optical disc, a Read Only Memory (ROM), a Random Access Memory (RAM), or the like.

Preferred embodiments of the present disclosure are described above in detail, but the present disclosure is not limited to the above implementations. A person skilled in the art can also make various equivalent transformations or replacements without departing from the spirit of the present disclosure. These equivalent transformations or replacements are all encompassed in the scope defined by the claims of this application.

The invention claimed is:

1. A method for vein recognition, comprising:
performing a difference operation and a channel connection on two to-be-verified target vein images respectively to obtain a difference image and a two-channel image of the two target vein images, wherein performing a difference operation and a channel connection on two to-be-verified target vein images respectively comprises: taking a pair of to-be-verified homologous or heterologous images as a sample, adding or subtracting the sample by arithmetic operation or directly superimposing the sample on the channel connection, and taking the sample as the input of a convolutional neural network (CNN) for supervised training on the CNN;
performing the channel connection on the obtained difference image and two-channel image to obtain a three-channel image, so as to use the three-channel image as an input of the CNN;
training a pre-trained model SqueezeNet using an ImageNet;
fine-tuning the pre-trained model SqueezeNet trained using the ImageNet; and integrating the difference image and the three-channel image through a cascade optimization framework to obtain a recognition result;

wherein the method further comprises: fine-tuning the pre-trained model SqueezeNet for a first time with the difference image to obtain an optimization model, and fine-tuning the optimization model for a second time with the three-channel image to obtain a final optimization model.

2. The method of claim 1, wherein the pre-trained model SqueezeNet comprises a Fire module.

3. The method of claim 2, wherein the Fire module comprises a squeeze layer and an expand layer, the squeeze layer is a convolutional layer composed of a 1*1 convolutional kernel, and the expand layer is a convolutional layer composed of 1*1 and 3*3 convolutional kernels connected.

4. The method of claim 1, wherein the two to-be-verified target vein images are homologous or heterologous images.

5. A vein recognition device, comprising at least one control processor and a memory communicatively connected with the at least one control processor, wherein the memory stores instructions executable by the at least one control processor, wherein the instructions are executed by the at least one control processor to enable the at least one control processor to perform the method of claim 1.

6. A non-transitory computer readable storage medium storing instructions that, when executed by a computer, cause the computer to perform the method of claim 1.

\* \* \* \* \*